Feb. 1, 1949.  A. MACHTINGER  2,460,518
LIQUID DISPENSER
Filed March 8, 1946

INVENTOR
*Abraham Machtinger*
BY
ATTORNEY

Patented Feb. 1, 1949

2,460,518

UNITED STATES PATENT OFFICE 2,460,518

LIQUID DISPENSER

Abraham Machtinger, New York, N. Y.

Application March 8, 1946, Serial No. 653,012

1 Claim. (Cl. 285—40)

My invention relates to improvements in dispensing means, principally for liquids from kegs or the like containers, and it is the principal object of the invention to provide a positively non-leaking connection between the keg and the tapping device.

Another object of my invention is to provide such a device in which the washer between tap and bung is firmly held against distortion within a suitable frame.

A further object of my invention is to provide a dispensing device for liquids which is simple and inexpensive in its construction and yet durable and highly efficient in use.

These and other objects and advantages of my device will become more fully apparent as the description thereof proceeds and will then be more specifically defined in the appended claim.

In the accompanying drawing forming a material part of this disclosure:

Figure 1:
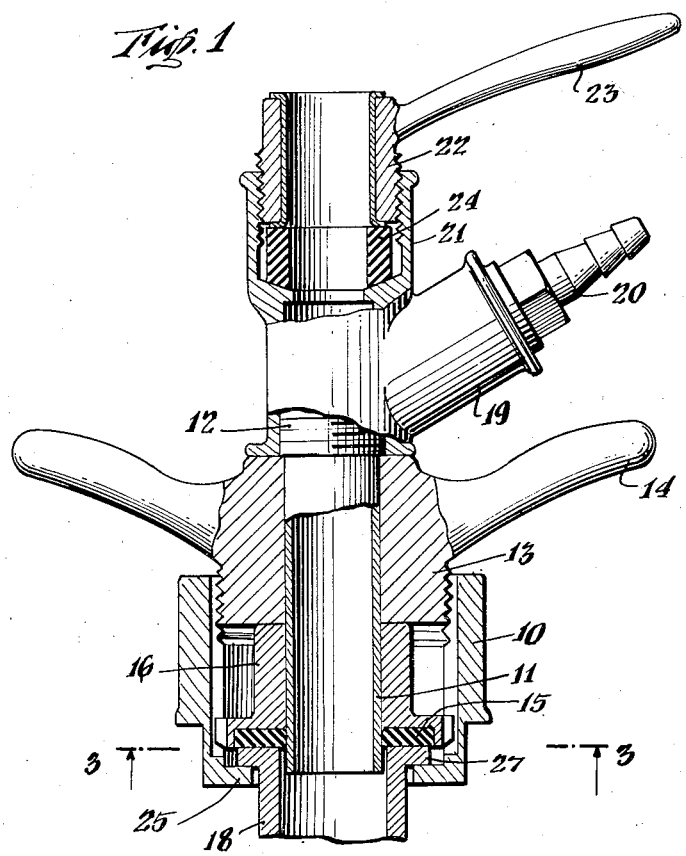
Fig. 1 is a sectional front elevation of a tap and connection between barrel or other container embodying my invention.
Figure 2:
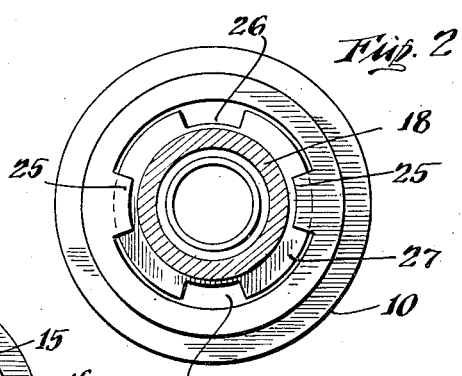
Fig. 2 is a bottom plan view thereof, the tap bush being shown in section.
Figure 3:
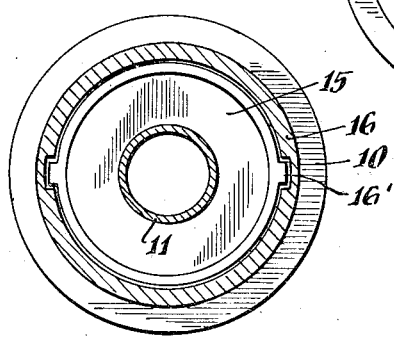
Fig. 3 is a section of line 3—3 of Fig. 1.

Referring now in detail to the drawings, a connecting sleeve 10 detachably connects the hollow cylindrical tap body 11 to the tap bush 18 protruding from the cask or container, not illustrated. Bush 18 has the external flanges 27 relieved by the openings 26 through which the lugs 25 may be passed for engagement or disengagement of sleeve 10 with bush 18. Bush 18 further comprises the substantially flat, annular outer face 12 for engagement by the resilient washer 15.

A wing nut 13 comprising wings 14 is freely rotatable on tap body 11 and is externally threaded and engageable with the internally threaded connecting sleeve 10. Sleeve 10 is formed with the diametrically opposite keyways 16A, engaged by the keys 16B of the washer seat sleeve 16 of body 11, sleeve 16 being pressed onto body 11 so tightly that for all conditions of ordinary use they are practically integral.

The gas inlet tube 19 is formed integral with body 11 and is threaded to receive the nipple 20, the latter comprising a valve, not shown, by which gas introduced through nipple 20 is prevented from escaping. An internally threaded cup 21 receives the externally threaded tube 22 comprising the handle 23 by which it may be turned down in cup 21 to compress the resilient washer 24.

In operation, a draft tube, not shown, may be inserted through tap body 11 and bush 18 into the interior of the container and a gas tight seal of the draft tube in the tap body is then provided by turning down tube 22 on washer 24 so that the latter compressively engages the draft tube.

The tap body 11 sealingly engages outer face 12 of tap bush 18 by means of the resilient washer 15 of substantially rectangular cross section located in the correspondingly shaped recess 15A of sleeve 16, washer and recess being located opposite face 12 of bush 18 in the operative position of tap and bush and the washer and recess being substantially equal in inner and outer diameter to face 12.

The lugs 25 of sleeve 10 having been engaged under flanges 27 of bush 18, rotation of nut 13 causes tap body 11 to travel downwards in sleeve 10, forcing washer 15 against face 12 of bush 18 to establish a gas tight connection between tap and container.

The invention resides solely in the superior seating of washer 15 in recess 15A of sleeve 16, whereby the compressive engagement of washer 15 and face 12 is substantially prevented from warping or otherwise deforming washer 15 and deterioration of the latter is thereby inhibited.

The operation and use of my invention will be entirely clear from the above description at the hand of the drawing, the main object of my invention being the guiding of the washer 15 within its frame 16 to provide at all times a straight face preventing warping and thereby a chance of leaking.

It will be understood that I have described and shown the preferred form of my invention as one example only of the many possible ways to practically construct the same and that I may make such changes in the general arrangement and in the construction of the minor details thereof as come within the scope of the appended claim without departure from the spirit of my invention and the principles involved.

Having thus described my invention what I claim is:

In a tap for containers of the type comprising a protruding tap bush, the latter comprising an outer face adapted to be engaged by a resilient washer and further comprising means for detachably engaging a tap, in combination, a substantially hollow cylindrical tap body, said tap body being formed with a recess of substantially rectangular cross section, said recess being located opposite said face of said bush in the operative position of tap and bush, said recess further being substantially equal in inner and outer dameter to aid face of said bush, a resilient washer of substantially rectangular cross section located in said recess so as to present a resilient and non warping face to said face of said bush, and means engageable with said tap and bush for detachably connecting the two together.

ABRAHAM MACHTINGER.

REFERENCES CITED

The following references are of record in the file of this patent:

UNITED STATES PATENTS

| Number | Name | Date |
| --- | --- | --- |
| 2,070,412 | Rice | Feb. 9, 1937 |